May 8, 1923.

E. J. MILLER

PUZZLE

Filed Sept. 23, 1921     6 Sheets-Sheet 1

1,454,131

LINK 1
LINK 2
LINK 3
LINK 4
LINK 5

PUT STRING OVER TOP LINK; PULL DOWN INTO BEND OF LINK. (BETWEEN LEAVES OF LINK 2. THIS IS CALLED "THREADING" THE TOP LINK.

PULL THRU EYE OF LINK 2.

DISENGAGE FROM TOP LINK

PULL INTO BEND OF LINK 2. (BETWEEN LEAVES OF LINK 3)

PULL THRU EYE OF LINK 3. (AS IN FIG. 3, FOR 2ND. LINK)

Earl J. Miller
INVENTOR.

BY

Edward R. Inman
ATTORNEY

Figure 5:
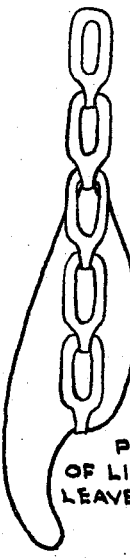

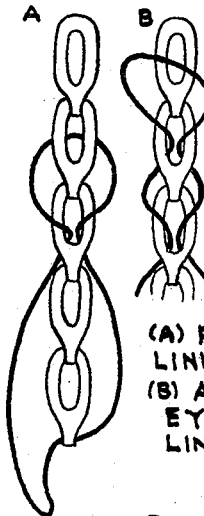
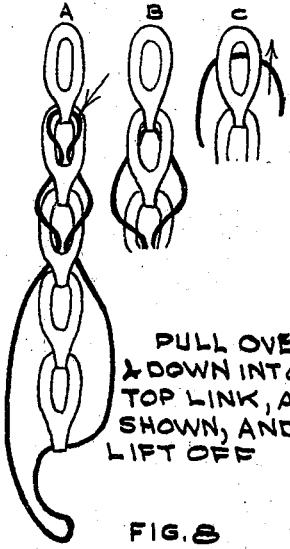
(A) PULL INTO LINK 2
(B) AND THRU EYE OF LINK 2
FIG. 7
PULL OVER & DOWN INTO TOP LINK, AS SHOWN, AND LIFT OFF
FIG. 8
PULL DOWN INTO BEND OF LINK 3 (BETWEEN LEAVES OF LINK 4) AS IN FIG. 5 FOR LINK 2
FIG. 9
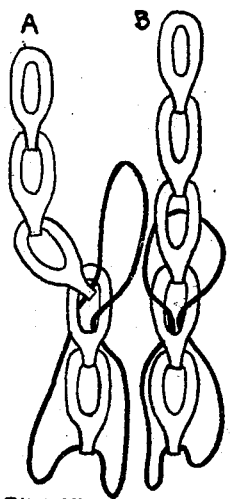
(A) PULL THRU EYE OF LINK 4
(B) AND UP INTO LINK 3
FIG. 10
PULL THRU EYE OF LINK 3.
FIG. 11
"THREAD" THE TOP LINK.
FIG. 12

Figure 3:
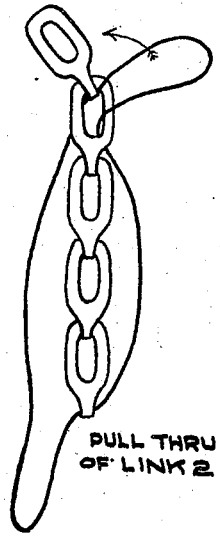
Figure 4:
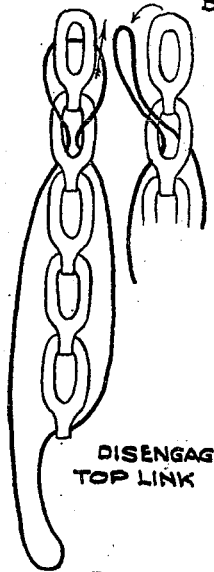

May 8, 1923.  
E. J. MILLER  
PUZZLE  
Filed Sept. 23, 1921  
1,454,131  
6 Sheets-Sheet 3
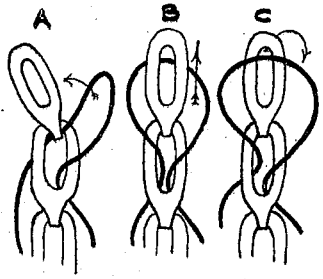
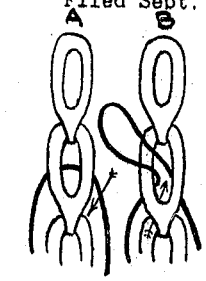
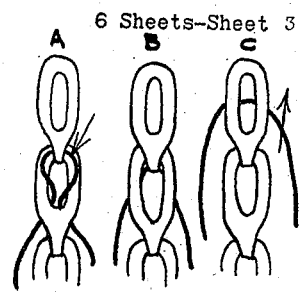
DISENGAGE FROM TOP LINK. (AS SHOWN IN FIGS. 3 & 4)
(A) PULL INTO BEND OF LINK 2, (B) AND UP THRU THE EYE OF LINK 2
PULL OVER TOP LINK AND LIFT OFF. (AS SHOWN IN FIG. 8)
FIG. 13
FIG. 14
FIG. 15
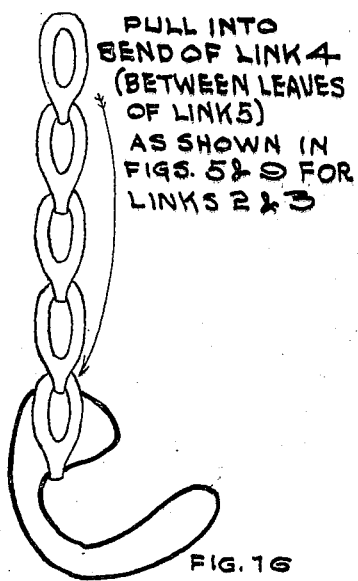
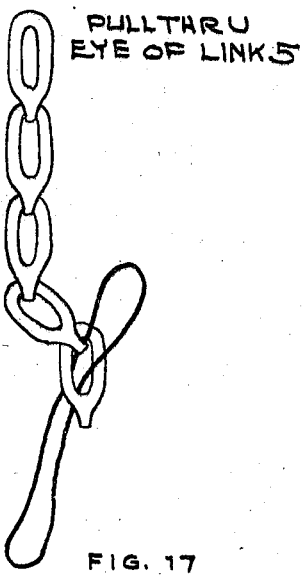
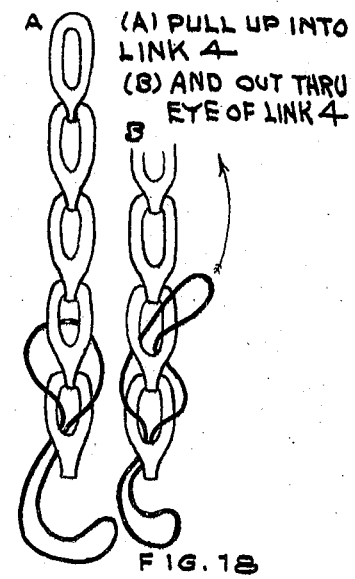
PULL INTO BEND OF LINK 4 (BETWEEN LEAVES OF LINK 5) AS SHOWN IN FIGS. 5 & 9 FOR LINKS 2 & 3
PULL THRU EYE OF LINK 5
(A) PULL UP INTO LINK 4 (B) AND OUT THRU EYE OF LINK 4
FIG. 16
FIG. 17
FIG. 18
Earl J. Miller  
INVENTOR.
BY
Edward R. Inman  
ATTORNEY.

May 8, 1923.  1,454,131

E. J. MILLER

PUZZLE

Filed Sept. 23, 1921  6 Sheets-Sheet 4

THREAD THE
TOP LINK

DISENGAGE
FROM TOP
LINK.
(AS SHOWN
IN FIG. 13;
ALSO IN FIGS.
3 & 4)

PULL INTO
BEND OF
LINK 2 (BE-
TWEEN LEAVES
OF LINK 3)

PULL THRU
EYE OF
LINK 3
AS IN FIG. 6

(A) PULL INTO
LINK 2
(B) AND THRU
EYE OF LINK 2

PULL OVER
TOP LINK AND
LIFT OFF (AS
SHOWN IN FIG 8)

Earl J. Miller
INVENTOR.

BY

Edward R. Inman
ATTORNEY.

May 8, 1923.

E. J. MILLER

PUZZLE

Filed Sept. 23, 1921

1,454,131

6 Sheets-Sheet 5

PULL DOWN INTO BEND OF LINK 3 (BETWEEN LEAVES OF LINK 4)

(A) LIFT INTO LINK 3
(B) PULL OUT THRU EYE OF LINK 3

THREAD THE TOP LINK

DISENGAGE FROM TOP LINK (AS SHOWN IN FIG. 13) (ALSO IN FIGS. 3 & 4)

PULL INTO BEND OF LINK 2 (BETWEEN LEAVES OF LINK 3)

(A) LIFT INTO LINK 2
(B) PULL OUT THRU EYE OF LINK 2.

*Earl J. Miller* INVENTOR.

BY

*Edward R. Inman* ATTORNEY.

May 8, 1923.  E. J. MILLER  1,454,131
PUZZLE
Filed Sept. 23, 1921   6 Sheets-Sheet 6
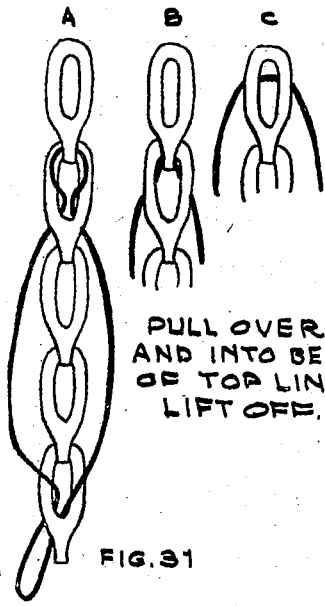
FIG. 31 — PULL OVER AND INTO BEND OF TOP LINK. LIFT OFF.
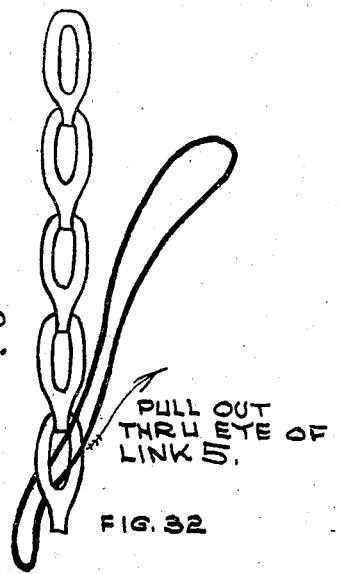
FIG. 32 — PULL OUT THRU EYE OF LINK 5.
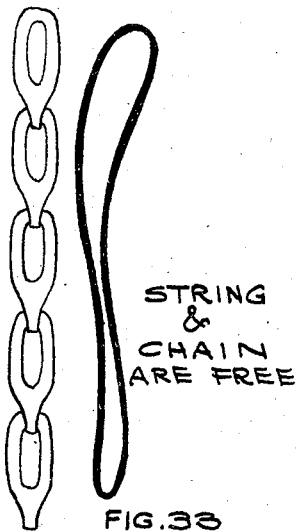
FIG. 33 — STRING & CHAIN ARE FREE
Earl J. Miller INVENTOR.
BY Edward R. Inman ATTORNEY.

Patented May 8, 1923.

1,454,131

UNITED STATES PATENT OFFICE.

EARL J. MILLER, OF BETHLEHEM, PENNSYLVANIA.

PUZZLE.

Application filed September 23, 1921. Serial No. 502,732.

*To all whom it may concern:*

Be it known that I, EARL J. MILLER, citizen of the United States, residing at Bethlehem, in the county of Northhampton and State of Pennsylvania, have invented certain new and useful Improvements in Puzzles, of which the following is a specification.

My improved puzzle comprises a plurality of assembled links of a chain of the type known as "safety" chain or any suitable modification thereof, together with an endless flexible band or cord, such as a rubber band, cord, string of fine chain, and the solution of this puzzle consists, either in placing said flexible member upon the last link of said chain, or removing same therefrom without disassembling the chain or breaking the flexible member.

The puzzle consists, therefore, of two members, namely, the chain consisting of a plurality of links, identical in form, each of which is flexibly engaged with an adjacent link in linear relation, and the endless band, which when the puzzle is in the course of solution, form a combination, the elements of which cooperate and inter-relate for the production of the specific object of the invention, viz, the solution of the puzzle.

A chain with any number of links may be employed, but, owing to the simplicity of the process of solution when less than three links are employed, this is the smallest number which is likely to be employed. The most desirable number of links is five, since the solution involved thereby is quite difficult, but at the same time is not sufficiently intricate and involved to tax the patience and persistence of one engaged in the solution. However, any number of links may be employed, but since the steps of the operation of solution increase in a geometrical ratio for the addition of each link, it will be seen that the addition of links above five would soon involve a solution which would be so protracted, laborious and tedious as not to be attractive and would thus defeat the object for which puzzles are usually intended.

Assuming, therefore, that a chain of five links will be the most popular form of puzzle, I will describe, step by step, the method of solution when a chain is employed comprising this number of links.

Figure 1:
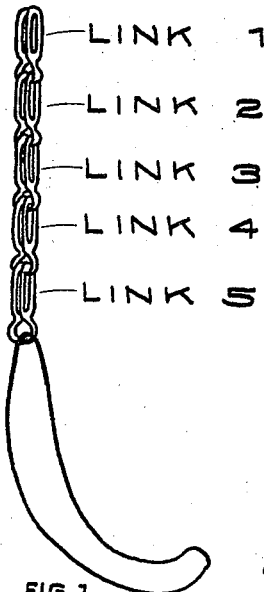

For the purpose of making clear the various steps which comprise the process of solution, I have supplied the accompanying drawings in which:

Fig. 1 is a perspective view of the puzzle and represents the position and arrangements of its elements or members previous to the commencement of the solution.

Figure 2:
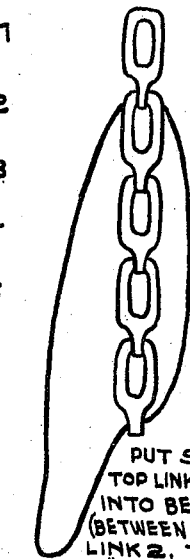

Fig. 2, together with the related notes, indicate the first step in the solution of the puzzle.

Fig. 3, together with the related notes, indicate the second step in the solution of the puzzle.

Fig. 4, consisting of two views, together with the related notes, indicate the third step in the solution.

Fig. 5, together with the related notes, indicate the fourth step of the solution.

Figure 6:
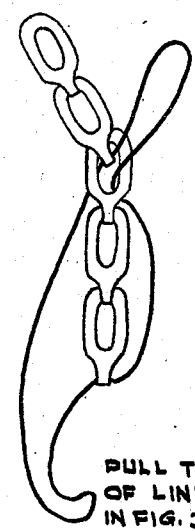

Fig. 6, together with the related note, indicate the fifth step of the solution.

Fig. 7, consisting of two views, together with the related note, indicate the sixth step in the solution.

Fig. 8, consisting of three views, together with the related note indicate the seventh step of the solution.

Fig. 9, together with the related note, inindicate the eighth step of the solution.

Fig. 10, comprising two views, together with the related note, indicate the ninth step of the solution.

Fig. 11, together with the related note, indicate the tenth step of the solution.

Fig. 12, together with the related note, indicate the eleventh step of the solution.

Fig. 13, comprising three views, together with the related note, indicate the twelfth step of the solution.

Fig. 14, comprising two views, together with the related note, indicate the thirteenth step in the solution.

Fig. 15, together with the related note, indicate the fourteenth step of the solution.

Fig. 16, together with the related note, indicate the fifteenth step of the solution.

Fig. 17, together with the related note, indicate the sixteenth step of the solution.

Fig. 18, comprising two views, together with the related note, indicate the seventeenth step.

Figure 19:
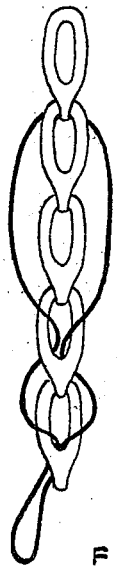

Fig. 19, together with the related note, indicate the eighteenth step.

Figure 20:
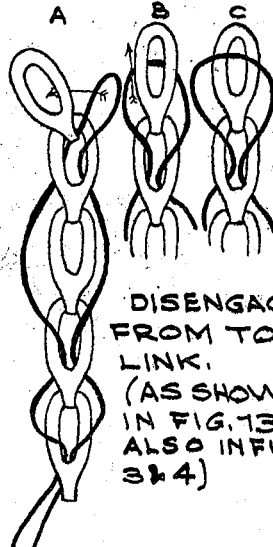

Fig. 20, comprising three views, together with the related note, indicate the nineteenth step.

Figure 21:

Fig. 21, together with the related note, indicate the twentieth step.

Figure 22:
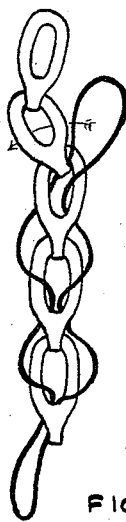

Fig. 22, together with the related note, indicate the twenty-first step of the solution.

Figure 23:
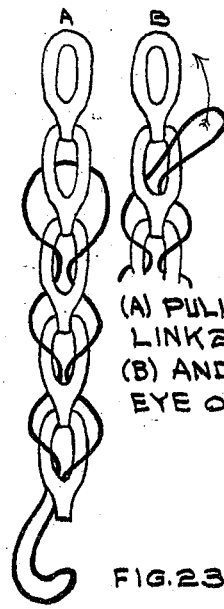

Fig. 23, comprising two views, together with the related note, indicate the twenty-second step of the solution.

Figure 24:
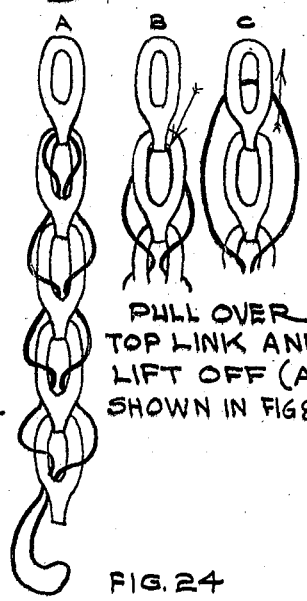

Fig. 24, comprising three views, together with the related note, indicate the twenty-third step of the solution.

Figure 25:
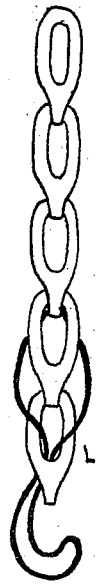

Fig. 25, together with the related note, indicate the twenty-fourth step.

Figure 26:
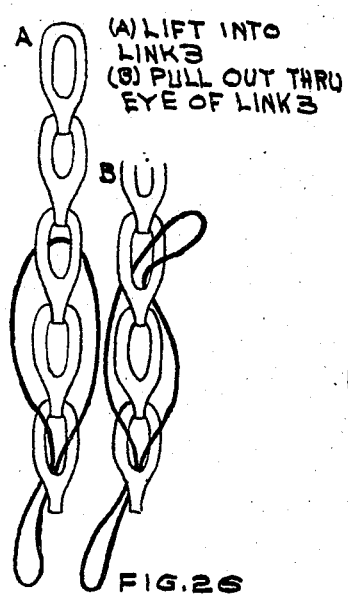

Fig. 26, comprising two views, together with the related note, indicate the twenty-fifth step of the solution.

Figure 27:

Fig. 27, together with the related note, indicate the twenty-sixth step.

Figure 28:

Fig. 28, comprising three views, together with the related note, indicate the twenty-seventh step of the solution.

Figure 29:

Fig. 29, together with the related note, indicate the twenty-eighth step of the solution.

Figure 30:
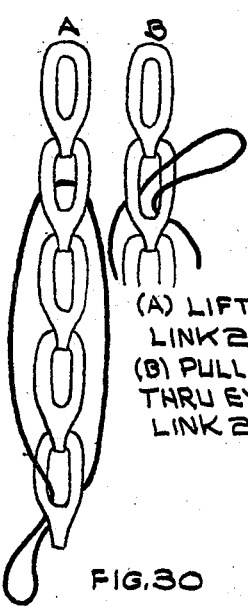

Fig. 30, comprising two views, together with the related note, indicate the twenty-ninth step.

Fig. 31, comprising three views, together with the related note, indicate the thirtieth step of the solution.

Fig. 32, indicates the relation of the elements after the performance of the thirtieth step.

Fig. 33 indicates the endless cord as freed from the chain, and thus, the solution of the puzzle.

Inasmuch as the various figures of the drawings are elucidated in such a way as to make a full, complete and sufficient disclosure of the process of solving the puzzle, it is deemed that no further explanation is necessary. It is, however, pointed out that, in case a chain having three links is employed, the process of solution will consist of the operation shown in Figs. 1 to 9. If a chain of four links is employed, the solution will consist of the operations shown in Figs. 1 to 17.

These processes may be modified in such a manner that the loop may be finally removed from any intermediate link, or from the first link instead of the last link as shown.

Furthermore, the solution of the puzzle may consist in putting the loop upon the last link without disassembling the chain, instead of removing same therefrom. Usually the links are disassembled, and the loop engaged with the last link, as shown in Fig. 1, in which case the solution is to disengage the loop from the chain without disassembling the links.

Having thus fully described my invention, what I claim and desire to secure by Letters Patent is:

1. An article of manufacture comprising a chain of the so-called safety type composed of two or more assembled links, and a flexible, endless cord engaging one of said links to form a puzzle, the solution of which consists in the disengagement of said cord from said chain without disassembling the chain or severing said cord.

2. An article of manufacture comprising a chain composed of two of more assembled links, which have a substantially U-shaped form, the ends of which links are each provided with an eye for the passage therethrough of one end of the link which is in engagement therewith and for the normal engagement of the bend of said engaged link, and an endless, flexible member engaging one said links to form a puzzle, the solution of which consists in the disengagement of said endless member from said chain without disassembling the chain or severing said member.

In testimony whereof I affix my signature in the presence of two witnesses.

EARL J. MILLER.

Witnesses:
  GEORGE E. FINDON, Jr.,
  WESTON H. MEASE.